United States Patent [19]

Watabe et al.

[11] 4,305,850
[45] Dec. 15, 1981

[54] PROCESS FOR DECOMPOSING VULCANIZED RUBBER

[75] Inventors: Yoji Watabe, Hachiohji; Hideo Takeichi, Murayama; Akihiro Maebara; Arata Miyagi, both of Kodaira; Koichi Irako, Murayama, all of Japan

[73] Assignee: Bridgestone Tire Co., Ltd., Tokyo, Japan

[21] Appl. No.: 185,672

[22] Filed: Sep. 10, 1980

[30] Foreign Application Priority Data

Sep. 14, 1979 [JP] Japan .................. 54-117323

[51] Int. Cl.$^3$ .......................... B29H 19/00; C08J 7/02
[52] U.S. Cl. .................................. 260/2.3; 260/714; 260/720; 528/481
[58] Field of Search ................ 260/2.3, DIG. 28, 714; 528/481

[56] References Cited

U.S. PATENT DOCUMENTS 3,042,634  7/1962  Mankowich et al. ................. 260/2.3
4,161,464  7/1979  Nicholas ............................. 260/2.3

*Primary Examiner*—Theodore E. Pertilla
*Attorney, Agent, or Firm*—Brooks, Haidt, Haffner & Delahunty

[57] ABSTRACT

Vulcanized rubber is decomposed by treating 100 parts by weight of vulcanized rubber with a solution containing 1–30 parts by weight of a diacyl peroxide having decomposition temperature of 90° C. or below and at least one member capable of swelling vulcanized rubber selected from the group consisting of solvents and radical-polymerizable monomers.

6 Claims, No Drawings

PROCESS FOR DECOMPOSING VULCANIZED RUBBER

BACKGROUND OF THE INVENTION

1. Field of the Invention

The present invention relates to a process for decomposing vulcanized rubber.

2. Description of the Prior Art

As the result of recent remarkable development of motorization, the amount of used tires has increased rapidly and its treatment has become a big problem. Heretofore, used tires have been used for filling-up, the structural shape itself has been used or they have been simply burned. However, these treatments are not desired from viewpoint of prevention of environmental pollution and effective use of material resources.

For the purpose of fulfilling the above-mentioned demands, reclamation of used tires has been carried out since a long time ago. Studies on reclaiming used vulcanized rubber have recently become active, and various new processes and agents for reclaiming have been proposed in succession.

A thermal decomposition process which is recently noted is one of treatments for used tires. In this process, used tires are thermally decomposed at high temperature between 400° C. and 900° C. by a dry distillation method which is carried out under anaerobic conditions on a partial combustion method to yield gas, oil and solid residues. The resulting gas and oil are used for fuel and the resulting solid residue is used for carbon material.

There has been recently proposed a process in which vulcanized rubber is mixed with oils and decomposed at lower temperature than that of the above-mentioned process, namely, at 210°–400° C. in an autoclave or screw extruder to produce a molten product of vulcanized rubber. However, these processes require higher temperature than 200° C. to decompose vulcanized rubber. Therefore, it is desirable that a reclaiming process which is carried out at lower temperature, with less consumption of energy at a reduced cost is developed.

Although a few papers have been reported on reactions of peroxides with unvulcanized rubber and decomposition of unvulcanized rubber with peroxides, there have not been any reports on decomposition of vulcanized rubber with peroxides.

SUMMARY OF THE INVENTION

According to the present invention, there is provided a process for decomposing vulcanized rubber which comprises treating 100 parts by weight of vulcanized rubber with a solution containing 1–30 parts by weight of a diacyl peroxide having decomposition temperature of 90° C. or below and at least one member capable of swelling vulcanized rubber selected from the group consisting of solvents and radical-polymerizable monomers.

It is an object of the present invention to provide a process for decomposing vulcanized rubber effectively at relatively low temperatures of 100° C. or below.

It is another object of the present invention to provide a process for producing decomposition products in a liquid to semi-solid state by controlling the degree of decomposition of solutions of decomposed rubber which are useful for industry.

It is still another object of the present invention to provide a process for decomposing vulcanized rubber which does not always require apparatuses for heating since the decomposition reaction proceeds at relative low temperatures.

DESCRIPTION OF THE PREFERRED EMBODIMENTS

Vulcanized rubbers which can be decomposed by the process of the present invention are not only tire rubber for a truck and a bus in which natural rubber is mainly used, but also tire rubber for a passenger car and used rubber such as rubber belts, rubber hoses, rubber sheets, rubber packings, and the like which are mainly made of synthetic rubber. Of course, scrap rubbers which are by-produced on molding or forming the above-mentioned articles can be used in the process of the present invention. These articles are made by a process in which sulfur, carbon black and other compounding ingredients are compounded with raw rubber, and then the resulting compound is vulcanized. However, unvulcanized rubber which has been compounded can be also used in the process of the present invention. Also, the process of the present invention can be applied to rubber cured with peroxides. Among them, rubber which carbon black is compounded with is preferable. It is not always necessary that the vulcanized rubber is in the form of powder. The vulcanized rubber may be in a form of block or cut piece as far as the size is suitable for decomposition reactors.

The peroxides used in the present invention are diacyl peroxides having decomposition temperatures of 90° C. or below. The decomposition temperature is that at which 50% of a peroxide decomposes in 10 hrs.

Examples of the diacyl peroxides are: iso-butyryl, octanonyl peroxide, decanoyl peroxide, lauroyl peroxide, 3,5,5-trimethylhexanoyl peroxide, succinic acid peroxide and benzoyl peroxide. Among them, lauroyl peroxide and benzoyl peroxide are especially preferable.

The peroxides are usually used in an amount of 1–30 parts by weight, preferably 3–20 parts by weight, per 100 parts by weight of vulcanized rubber. When the peroxide are used in an amount less than 1 part by weight, vulcanized rubber can not be enough decomposed. Also, by economical reason, it is not desirable that peroxides are used in an amount more than 30 parts by weight.

The solvents and radical-polymerizable monomers used in the present invention should be capable of swelling vulcanized rubber.

Examples of the solvents are: halogenated hydrocarbons such as carbon tetrachloride, chloroform, dichloromethane, tetrachloroethylene, trichloroethylene, dichloroethylene, chlorobenzene, and the like; aromatic hydrocarbons such as benzene, toluene, xylene, and the like; aliphatic or cycloaliphatic hydrocarbons such as pentane, hexane, heptane, octane, cyclohexane and the like; methyl ethyl ketone, methyl butyl ketone, and the like. Among them, halogenated hydrocarbons such as carbon tetrachloride, chloroform, dichloromethane, tetrachloroethylene, trichloroethylene, dichloroethylene, chlorobenzene, and the like are especially preferable.

Examples of the radical-polymerizable monomers are: vinyl monomers such as styrene, α-methyl styrene, o-, m- and p-chloro styrene, divinyl benzene, vinyl acetate and the like; and acrylic monomers such as acrylonitrile, methyl acrylate, ethyl acrylate, propyl acrylate, butyl acrylate, pentyl acrylate, hexyl acrylate, cyclohexyl acrylate, methyl methacrylate, ethyl methacrylate, propyl methacrylate, butyl methacrylate, pentyl methacrylate, hexyl methacrylate, cyclohexyl methacrylate, vinyl methacrylate, ethylene glycol dimethacrylate, acrylic acid, methacrylic acid, crotonic acid, and the like. Among them, methyl acrylate, methyl methacrylate, acrylic acid, and methacrylic acid are especially preferable. The monomers are usually used in an amount of 50–2000 parts by volume, preferably 1000–1500 parts by volume, per 100 parts by weight of vulcanized rubber. When the solvents or monomers are used in an amount less than 50 parts by volume, the decomposition of vulcanized rubber proceeds with difficulty. On the contrary, when the solvents or monomers are used in amount more than 2000 parts by volume, the decomposition of vulcanized rubber proceeds easily, but the resulting solution of decomposed vulcanized rubber becomes dilute. This is not desirable. In the case of using radical-polymerizable monomers, after completion of the decomposition reaction, plastic can be obtained by polymerization of the monomers used in the decomposition reaction. Articles formed of the plastic have excellent physical properties such as impact resistance and the like.

For carrying out the decomposition reaction of vulcanized rubber, an apparatus such as an autoclave having a stirrer is preferably used. Since the decomposition reaction of vulcanized rubber according to the present invention is an oxidative decomposition reaction, supply of air is necessary so that a stirrer is indispensable.

The reaction may be carried out at temperatures between 0° C. and 100° C. The reaction becomes slower at lower temperatures than 0° C. On the contrary, it is unsafe that the reaction may be carried out at temperatures beyond 100° C., because the solvents are used in the reaction system. It is not desirable that the reaction is carried out at temperatures except 0° C.–100° C. In the case that the reaction in a monomer-system is carried out at higher temperature, the monomer polymerizes by radical polymerization while the decomposition reaction of vulcanized rubber does not proceed sufficiently. Therefore, a homogenous solution can not be obtained, and it is not desirable to carry out the reaction at higher temperature.

The decomposed vulcanized rubber according to the present invention has various uses. For example, a solution of the decomposed vulcanized rubber after completion of the reaction may be used for adhesives without evaporation of a solvent used in the reaction. By evaporation of the solvent, rubber in a form of liquid or a half solid state is obtained. Consequently, the products may be used for process oil, softener, compounding ingredient for rubber such as filler, modifier for asphalt to be used in pavement, waterproof sheet, adhesive tape, sealers, calking compound, and sealing material. Further, in the case that monomers are used, plastic may be obtained by heating a solution of decomposed vulcanized rubber, the resulting plastic is excellent in impact strength.

The following examples will serve to further illustrate the present invention. The decomposition degree mentioned in the following examples was defined by a passing degree of vulcanized rubber in a diluted solution on passing through wire cloth of 200 mesh, said diluted solution being obtained by dilution of a solution obtained after completing reaction with tetrahydrofuran to several times. The passing degree was determined on the basis of rubber in which oils and rubber ingredients are removed by soaking vulcanized rubber to be treated into tetrahydrofuran.

The invention will be understood more readily by reference to the following examples; however, these examples are intend to illustrate the present invention and are not to be construed to limit the scope of the invention.

EXAMPLES 1–2, COMPARATIVE EXAMPLES 1–5

In an Erlenmeyer flask were placed 100 parts by weight of rubber powder (natural rubber 50% and styrene-butadiene rubber 50%), and 50% of carbon black based on the total amount of the natural rubber and styrene-butadiene rubber which was obtained from used tire rubber for passenger cars and the particle size thereof was 24–60 mesh. To 100 g. of the above-mentioned rubber powder was added 0.086 mol of any peroxide listed in Table 1 dissolved in 750 ml of chloroform. After the addition, the mixture was slowly stirred at 35°–40° C. without stoppering the flask so that the mixture was always kept in contact with fresh air. In Examples 1 and 2, the decomposition reaction immediately started, and the mixture became black. After reaction for 6 hours, the resulting mixture was passed through a wire cloth of 200 mesh, and the decomposition degree was determined.

As is clear from Table 1, the maximum decomposition degree is obtained in the case of using benzoyl peroxide (hereinafter referred to as "BPO"). Lauroyl peroxide gave a fairly high decomposition degree. On the contrary, in Comparative examples 1–5 in which peroxides other than diacylperoxides were used, the vulcanized rubber was scarcely decomposed. Consequently, diacylperoxides are specifically effective to decompose vulcanized rubber.

Pastly decomposed rubber was obtained by removing the solvent from the resulting solution in Example 2. The pasty decomposed rubber has molecular weight of 10,000–300,000 (peak value; 10,000–20,000), and may be useful for rubber compound.

EXAMPLES 3–5, COMPARATIVE EXAMPLES 6–7

For the purpose of finding the minimum amount of peroxides used for decomposing vulcanized rubber according to the present invention, tests were carried out in the same manner as in Example 1, except that an amount of BPO per 100 parts by weight of rubber powder was varied in the range of 0–21 parts by weight. Decomposition degrees determined after 4 hrs. of reaction are shown in Table 2.

Table 2 shows that decomposition reaction of vulcanized rubber scarcely proceeded under the condition that an amount of used BPO was 0.5 parts by weight or less, and the decomposition degree was 24% when BPO was used in an amount of 5 parts by weight.

EXAMPLES 6–16

For the purpose of researching the effects of the type of solution on the decomposition degree, 100 g. of the vulcanized rubber described in Example 1 was decomposed in 750 ml. of a solvent listed in Table 3 in the same manner as in Example 1. In this case, 21 g. of BPO was used. Table 3 shows the decomposition degree after 8 hrs. of reaction. The decomposition degree varies depending on the type of solvent. Among them, halogenated hydrocarbons such as carbon tetrachloride, chloroform, dichloromethane, chlorobenzene, and the like gave a very high degree of decomposition. Aromatic hydrocarbons such as toluene, benzene, and the like, and methyl ethyl ketone gave a fairly high degree of decomposition though it is less than by the halogenated hydrocarbons. n-Hexane or cyclohexane did not give a high degree of decomposition, but it is still enough to achieve the object of the present invention to produce reclaimed rubber. Consequently, such such solvents are also included in the scope of the present invention.

EXAMPLE 17

In 21 parts by weight of BPO dissolved in 750 parts by weight of methyl methacrylate was soaked 100 parts by weight of the same rubber powder as in Example 1, and the decomposition reaction was carried out at 35°–40° C. with stirring. After 4 hrs. of stirring, the vulcanized rubber was almost decomposed and a slightly viscous solution was obtained. The resulting solution was placed in a sealed vessel, heated at 70° C. for 30 minutes, and additively at 130° C. for 1 hr. to polymerize the monomer used in the decomposition reaction. The resulting polymer was formed into sheet form at 160° C. Because the obtained sheet of polymethylmethacrylate is modified with rubber, it has been found that the sheet is excellent in impact strength.

EXAMPLES 18–19, COMPARATIVE EXAMPLES 8–10

To 200 g. of the same rubber powder as in Example 1 was added 2.0 Kg of chlorobenzene to swell the rubber powder and then 20 g. of benzoyl peroxide was added, and the mixture was allowed to stand at room temperature for 8 hrs. Subsequently, the mixture was heated at 95° C. for 1 hr., and cooled. The cooled mixture was poured into a large amount of methanol, and the product was recovered and dried. The resulting half-solid product was added to the SBR compound as described in Table 4, the resulting compound was vulcanized, and the physical properties were determined. The physical properties were compared with those of compounds in which a thermal decomposition product (supplied by Japan Synthetic Rubber Co., Ltd.) of used rubber tire was used instead of the decomposition product according to the present invention.

From the results shown in Table 4, it is clear that physical properties of the rubber obtained by compounding the decomposition rubber according to the present invention are much superior to those of compound by a commercially available thermal decomposition rubber.

TABLE 1

| | Type of Peroxide | Decomposition degree (%) |
|---|---|---|
| Example 1 | lauroyl peroxide | 42 |
| Example 2 | benzoyl peroxide | 100 |
| Comparative example 1 | 1,1-bis(t-butylperoxy) 3,3,5-trimethyl cyclohexane | 5 |
| Comparative example 2 | dicumyl peroxide | 1 |
| Comparative example 3 | di-isopropyl benzene hydroperoxide | 0 |
| Comparative example 4 | cumene hydroperoxide | 3 |
| Comparative example 5 | t-butyl hydroperoxide | 3 |

TABLE 2

| | Amount of BPO (parts)* | Decomposition degree (%) |
|---|---|---|
| Comparative example 6 | 0.0 | 0 |
| Comparative example 7 | 0.5 | 5 |
| Example 3 | 5 | 24 |
| Example 4 | 11 | 43 |
| Example 5 | 21 | 76 |

*parts by weight per 100 parts by weight of rubber powder

TABLE 3

| | Solvent | Decomposition degree (%) |
|---|---|---|
| Example 6 | carbon tetrachloride | 85 |
| Example 7 | chloroform | 100 |
| Example 8 | dichloromethane | 100 |
| Example 9 | tetrachloroethylene | 61 |
| Example 10 | trichloroethylene | 42 |
| Example 11 | chlorobenzene | 97 |
| Example 12 | benzene | 76 |
| Exxample 13 | toluene | 50 |
| Example 14 | methyl ethyl ketone | 71 |
| Example 15 | cyclohexane | 33 |
| Example 16 | n-hexane | 25 |

TABLE 4

| | Comparative example 8 | Comparative example 9 | Comparative example 10 | Example 18 | Example 19 |
|---|---|---|---|---|---|
| Formulation* | | | | | |
| Thermal decomposition rubber (supplied by Japan Snythetic Rubber Co., Ltd.) (parts by weight) | — | 12.5 | 2.5 | — | — |
| Decomposed rubber according to the invention (parts by weight) | — | — | — | 12.5 | 2.5 |
| Physical properties | | | | | |
| 10% Modulus (Kg/cm²) | 4.7 | 4.5 | 3.9 | 5.7 | 6.4 |
| 300% Modulus (Kg/cm²) | 112 | 92 | 77 | 103 | 94 |
| $T_B$ (Kg/cm²) | 237 | 209 | 196 | 249 | 242 |

TABLE 4-continued

|  | Comparative example 8 | Comparative example 9 | Comparative example 10 | Example 18 | Example 19 |
|---|---|---|---|---|---|
| $E_L$ (%) | 490 | 540 | 610 | 570 | 600 |

*SBR (No. 1502, supplied by Japan Synthetic Rubber Co., Ltd.); 100 parts HAF; 40 parts
Aroma (tradename, supplied by Japan Synthetic Rubber Co., Ltd.); 8 parts Stearic acid; 1,5 parts
Antioxidant (tradename 810NA, supplied by Ouchishinko Co., Ltd.) ZnO; 4 parts
Accelerator; {dibenzothiazyl-disulfide 1 part / diphenylguaridine 0.5 parts}
Sulfur; 1,9 parts
Vulcanization conditions; 155° C. × 30 minutes
In this footnote, part and parts are by weight

What we claim is:

1. A process for decomposing vulcanized rubber, which process comprises treating each 100 parts by weight of vulcanized rubber with a solution containing 1–30 parts by weight of a diacyl peroxide having a decomposition temperature of 90° C. or below and at least one agent capable of swelling vulcanized rubber, the swelling agent being selected from the group consisting of solvents and radical-polymerizable monomers and the process being carried out at a temperature of from 0° C. to 100° C.

2. A process for decomposing vulcanized rubber according to claim 1 in which the diacyl peroxide is benzoyl peroxide or lauroyl peroxide.

3. A process for decomposing vulcanized rubber according to claim 1 in which the solvent is a halogenated hydrocarbon selected from the group consisting of carbon tetrachloride, chloroform, dichloromethane, tetrachloroethylene, trichloroethylene, dichloroethylene and chlorobenzene.

4. A process for decomposing vulcanized rubber according to claim 1 in which the monomer is selected from the group consisting of methyl acrylate, methyl methacrylate, acrylic acid, and methacrylic acid.

5. A process for decomposing vulcanized rubber according to claim 1 in which the peroxide is used in an amount of 3–20 parts by weight.

6. A process for decomposing vulcanized rubber according to claim 1 in which the vulcanized rubber is compounded with carbon black.

* * * * *